(12) United States Patent
Yeh et al.

(10) Patent No.: US 8,108,589 B2
(45) Date of Patent: Jan. 31, 2012

(54) WEAR LEVELING METHOD AND CONTROLLER USING THE SAME

(75) Inventors: Chih-Kang Yeh, Kinmen County (TW); Chien-Hua Chu, Hsinchu County (TW)

(73) Assignee: Phison Electronics Corp., Miaoli (TW)

( * ) Notice: Subject to any disclaimer, the term of this patent is extended or adjusted under 35 U.S.C. 154(b) by 511 days.

(21) Appl. No.: 12/017,550

(22) Filed: Jan. 22, 2008

(65) Prior Publication Data

US 2009/0094409 A1 Apr. 9, 2009

(30) Foreign Application Priority Data

Oct. 4, 2007 (TW) ................................ 96137244 A (51) Int. Cl.
*G06F 12/02* (2006.01)
(52) U.S. Cl. ................ 711/103; 711/E12.005; 714/47.1
(58) Field of Classification Search ........................ None
See application file for complete search history.

(56) References Cited

U.S. PATENT DOCUMENTS

| 5,485,595 | A * | 1/1996 | Assar et al. | 711/103 |
| 5,568,423 | A * | 10/1996 | Jou et al. | 365/185.33 |
| 2004/0080985 | A1 * | 4/2004 | Chang et al. | 365/185.33 |
| 2004/0083335 | A1 * | 4/2004 | Gonzalez et al. | 711/103 |
| 2005/0160218 | A1 | 7/2005 | See et al. | 711/103 |
| 2007/0033331 | A1 * | 2/2007 | Sinclair et al. | 711/103 |
| 2007/0245068 | A1 * | 10/2007 | Yero | 711/103 |
| 2008/0279005 | A1 * | 11/2008 | France | 365/185.11 |
| 2008/0313505 | A1 * | 12/2008 | Lee et al. | 714/47 |
| 2009/0089485 | A1 * | 4/2009 | Yeh | 711/103 |

FOREIGN PATENT DOCUMENTS

| CN | 1805049 | 7/2006 |
| CN | 1845082 | 10/2006 |

OTHER PUBLICATIONS

Taehee Cho, Yeong-Taek Lee, Eun-Cheol Kim, Jin-Wook Lee, Sunmi Choi, Seungjae Lee, Dong-Hwan Kim, Wook-Ghee Han, Young-Ho Lim, Jae-Duk Lee, Jung-Dal Choi, and Kang-Deog Suh. "A Dual-Mode NAND Flash Memory: 1-Gb Multilevel and High-Performance 512-Mb Single-Level Modes." Nov. 2001. IEEE. IEEE Journal of Solid-State Circuits. vol. 36. pp. 1700-1706.*

Yuan-Hao Chang, Jen-Wei Hsieh, and Tei-Wei Kuo. "Endurance Enhancement of Flash-Memory Storage Systems: An Efficient Static Wear Leveling Design." ACM. DAC 2007.*

Eran Gal and Sivan Toledo. "Algorithms and Data Structures for Flash Memories." Jun. 2005. ACM. ACM Computing Surveys. vol. 37. Issue 2. pp. 138-163.*

\* cited by examiner

*Primary Examiner* — Reginald Bragdon
*Assistant Examiner* — Nathan N Sadler
(74) *Attorney, Agent, or Firm* — J.C. Patents (57) ABSTRACT

A wear leveling method for non-volatile memory is provided, by which the non-volatile memory is substantially divided into a plurality of blocks and the blocks are grouped into a data area and a spare area. The method includes selecting a block based on an erased sequence when getting the block from the spare area. The method also includes performing a wear leveling procedure.

23 Claims, 11 Drawing Sheets

WEAR LEVELING METHOD AND CONTROLLER USING THE SAME

CROSS-REFERENCE TO RELATED APPLICATION

This application claims the priority benefit of Taiwan application serial no. 96137244, filed on Oct. 4, 2007. The entirety of the above-mentioned patent application is hereby incorporated by reference herein and made a part of this specification.

BACKGROUND OF THE INVENTION

1. Field of the Invention

The present invention relates to a wear leveling method. More particularly, the present invention relates to a wear leveling method for a non-volatile memory and a controller using the same.

2. Description of Related Art

With a quick developing of digital camera, cell phone camera and MP3, demand of storage media by customers is increased greatly. Since a flash memory has the advantages of non-volatile, energy saving, small size and none mechanical structure etc., it is suitable for portable applications, and especially for portable battery-powered products. Besides a demand of built-in memories of the portable products, demand of the flash memories used for external products such as small memory cards and flash drives is increased greatly in the market, since a user may simultaneously own a plurality of the memory cards and the flash drives. Therefore, the flash drive industry becomes a hot industry within the electronics industry recently.

Though the flash drive has the advantages of programmable, erasable, data saving after power-off, erase times of blocks within the flash memory are limited. For example, the blocks in the flash memory may be worn after being erased 10,000 times. Data loss may be caused when the storage capacity or performance of a flash memory is obviously deteriorated by its worn-out blocks.

Wearing of the flash memory blocks is determined by the number of times this block is programmed or erased. In other words, the wear of a block is relatively low if the block is programmed (or written) only once; contrarily, the wear of a block is relatively higher if the block is programmed and erased repeatedly. For example, when a host keeps writing data into a flash memory by using the same logical block address (LBA), the block having the corresponding physical block address (PBA) in the flash memory is then repeatedly written and erased.

Generally speaking, the existence of worn-out blocks will reduce the performance of a flash memory even if the wear of other blocks are still relatively low. Besides the deterioration in the performance of the worn-out blocks, the performance of the entire flash memory is also reduced when the good blocks cannot provide enough space for storing data. In other words, when the number of worn-out blocks in a flash memory exceeds a threshold value, the flash memory is considered unusable even there are still good blocks. In this case, those good blocks are wasted.

To prolong a lifespan of the flash drive, utilization of the blocks in the flash drive should be leveled. Generally, the blocks of the flash drive are grouped into a data area and a spare area. According to a conventional wear leveling method, when the flash drive is operated for a period of time, the blocks within the data area and the blocks within the spare area are logically exchanged sequentially, hopefully the blocks with lesser erase times may be exchanged to the data area for being programmed (or written). However, such method for logically exchanging the blocks within the data area sequentially to the blocks within the spare area cannot ensure the exchanged blocks are those with lesser erase times, and if the exchanged blocks are those with greater erase times, wearing of the blocks may be accelerated, and therefore an effect of the conventional wear leveling method is limited.

Accordingly, a novel wear leveling method is required to effectively prolong the lifespan of the flash drive.

SUMMARY OF THE INVENTION

The present invention is directed to a wear leveling method for a non-volatile memory, which may effectively level wearing of memory blocks, so as to prolong a lifespan of the memory.

The present invention is directed to a controller, by which a wear leveling method for a non-volatile memory may be applied, so as to effectively level wearing of memory blocks for prolonging a lifespan of the memory.

The present invention provides a wear leveling method for a non-volatile memory, by which the non-volatile memory is substantially divided into a plurality of blocks, and the blocks are at least grouped into a data area and a spare area. The method includes: (a) a physical block is selected based on an erased sequence of the physical blocks when the block is selected from a spare area; and (b) a wear leveling procedure is performed.

The present invention provides a controller for a storage device, a non-volatile memory of the storage device is substantially divided into a plurality of memory blocks, and the memory blocks are at least grouped into a data area and a spare area. The controller includes a non-volatile memory interface, a buffer memory, a microprocessor unit and a memory management module. The non-volatile memory interface is electrically connected to the microprocessor unit and used for accessing the non-volatile memory. The buffer memory is electrically connected to the microprocessor unit and used for temporarily storing data. The microprocessor is electrically connected to the microprocessor unit and used for controlling a whole operation of the controller. The memory management module is used for managing the non-volatile memory, wherein the memory management module selects a physical block based on an erased sequence of the physical blocks when the physical block is selected from the spare area and the memory management module exchanges a physical block in the spare area with a physical block in the data area.

The present invention provides a wear leveling method for a non-volatile memory, wherein the non-volatile memory is substantially divided into a plurality of physical blocks, and the physical blocks are at least grouped into a data area and a spare area. The wear leveling method includes: (a) recording utilization information of a plurality of logical blocks with a table; (b) selecting a physical block within the data area mapping to an unused logical block according to the utilization information; and (c) exchanging the selected physical block with a physical block within the spare area.

The present invention provides a controller for a storage device, wherein a non-volatile memory of the storage device is substantially divided into a plurality of memory blocks, and the memory blocks are at least grouped into a data area and a spare area. The controller includes a non-volatile memory interface, a buffer memory, a microprocessor unit and a memory management module. The non-volatile memory interface is electrically connected to the microprocessor unit and used for accessing the non-volatile memory. The buffer memory is electrically connected to the microprocessor unit and used for temporarily storing data. The microprocessor is electrically connected to the microprocessor unit and used for controlling a whole operation of the controller. The memory management module is electrically connected to the microprocessor unit and used for managing the non-volatile memory, wherein the memory management module records utilization information of a plurality of logical blocks with a table, selects a physical block within the data area mapping to an unused logical block according to the utilization information and exchanges the selected physical block with a physical block within the spare area.

In order to make the aforementioned and other objects, features and advantages of the present invention comprehensible, a preferred embodiment accompanied with figures is described in detail below.

DESCRIPTION OF EMBODIMENTS

Reference will now be made in detail to the present preferred embodiments of the invention, examples of which are illustrated in the accompanying drawings. Wherever possible, the same reference numbers are used in the drawings and the description to refer to the same or like parts.

A non-volatile memory storage system generally includes a non-volatile memory and a controller (control chip). The non-volatile memory storage system is generally used together with a host, such that the host may write data into the non-volatile memory storage system or read data from the non-volatile memory storage system. Moreover, the non-volatile memory storage system may include an embedded non-volatile memory and software which can be executed by a host system to substantially serve as a controller of the embedded non-volatile memory.

The First Embodiment

Figure 1A:
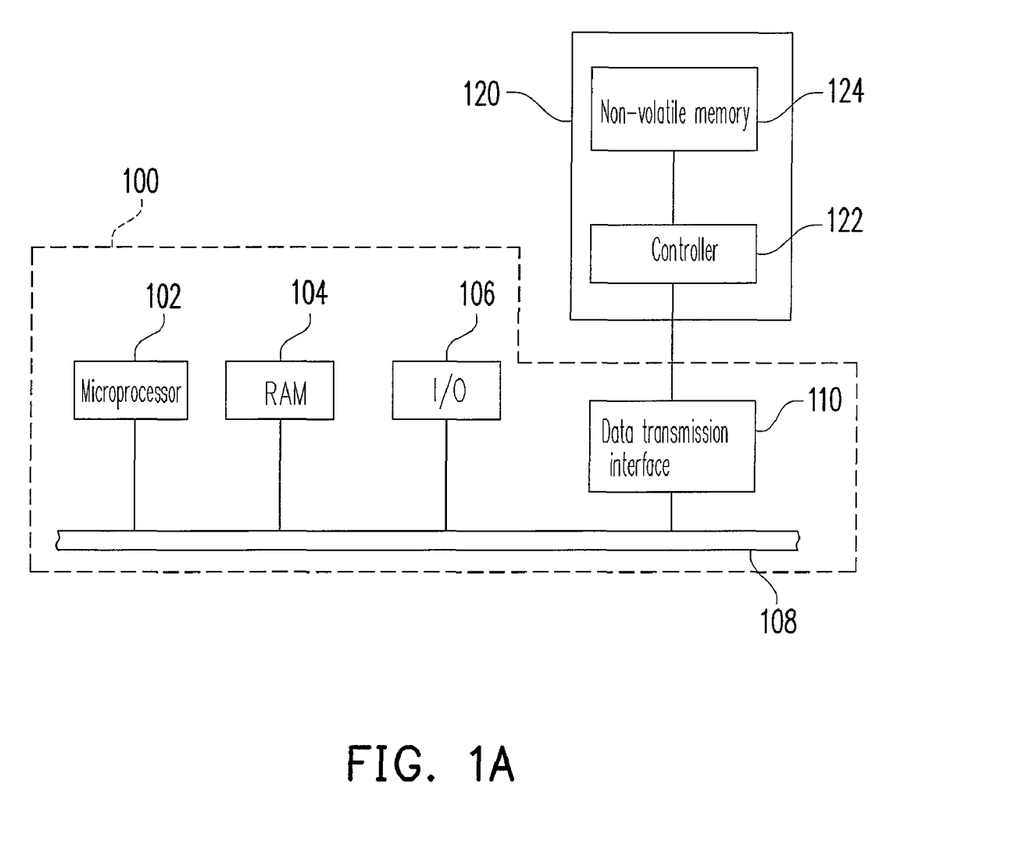
FIG. 1A is a diagram illustrating a host using a non-volatile memory storage device according to the first embodiment of the present invention.

FIG. 1A is a diagram illustrating a host using a non-volatile memory storage device according to the first embodiment of the present invention.

Referring to FIG. 1A, the host 100 includes a microprocessor 102, a random access memory (RAM) 104, an input/output (I/O) device 106, a system bus 108 and a data transmission interface 110. It should be understood by those skilled in the art that the host 100 may further include other devices such as a display device or a network device etc.

The host 100 may be a computer, a digital camera, a video camera, a communication apparatus, an audio player, or a video player etc. Generally, the host 100 may be any system that may store data.

A non-volatile memory storage device 120 of the present embodiment is electrically connected to the devices of the host 100 via the data transmission interface 110. By processing of the microprocessor 102, the RAM 104 and the I/O device 106, data may be written into the non-volatile memory storage device 120 or read from the non-volatile memory storage device 120. The non-volatile memory storage device 120 includes a flash drive, a memory card and a solid state drive (SSD).

Figure 1B:
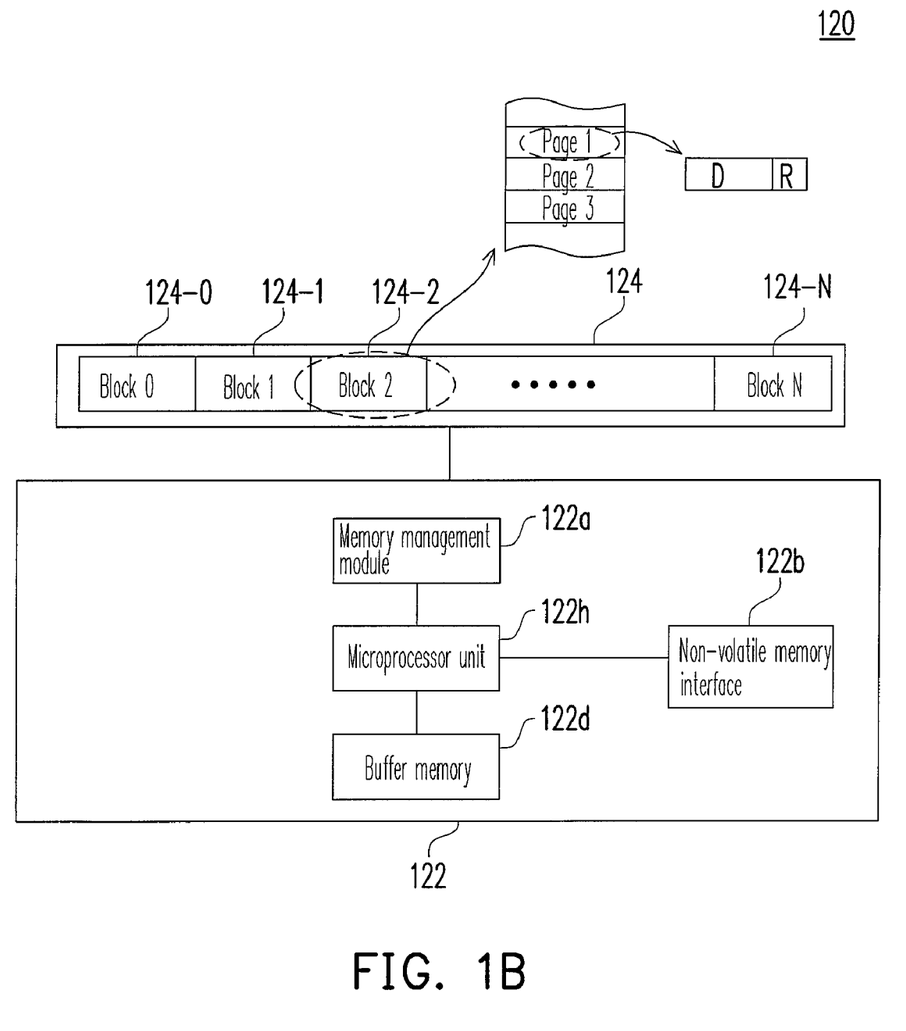
FIG. 1B is a detailed block diagram of the non-volatile memory storage device of FIG. 1A.

FIG. 1B is a detailed block diagram of the non-volatile memory storage device of FIG. 1A.

Referring to FIG. 1B, the non-volatile memory storage device 120 generally includes a controller 122 and a non-volatile memory 124.

The controller 122 is used for controlling the whole operation of the non-volatile memory storage device 120, such as storing of data, reading of data and erasing of data etc. The controller 122 includes a memory management module 122a, a buffer memory 122d, a microprocessor unit 122h and a non-volatile memory interface 122b.

The memory management module 122a is electrically connected to the microprocessor unit 122h and used for managing the non-volatile memory 124, such as executing a wear leveling method, managing bad blocks, maintaining a mapping table etc.

The non-volatile memory interface 122b is electrically connected to the microprocessor unit 122h and used for accessing the non-volatile memory 124. Namely, the data to be written by the host 100 is transformed into a format which may be identified by the non-volatile memory 124 via the non-volatile memory interface 122b.

The buffer memory 122d is electrically connected to the microprocessor unit 122h and used for temporarily storing the system data (for example, the mapping table) or the data read or written by the host. In the present embodiment, the buffer memory 122d is a static random access memory (SRAM). However, the present invention is not limited thereof, it should be understood that a dynamic random access memory (DRAM), a magnetic random access memory (MRAM), a phase-change random access memory (PCRAM) or other suitable memories may also be applied in the present invention.

The microprocessor 122h is used for controlling the whole operation of the controller 122.

Figure 1C:
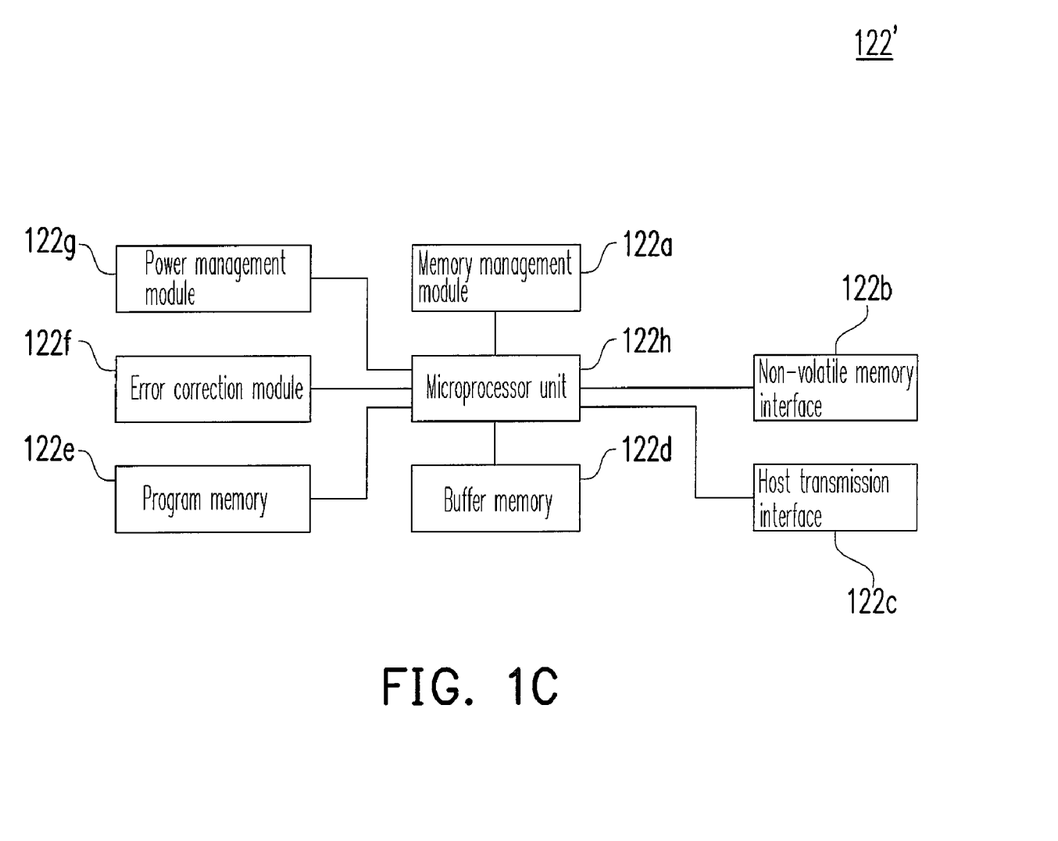
FIG. 1C is a detailed block diagram of a controller according to another embodiment of the present invention.

In another embodiment of the present invention, the controller may further include a host transmission interface 122c, a program memory 122e, an error correction module 122f and a power management module 122g (shown as a controller 122' of FIG. 1C).

The host transmission interface 122c is electrically connected to the microprocessor unit 122h and used for communicating with the host 100, and the host transmission interface 122c may be a USB interface, an IEEE 1394 interface, a SATA interface, a PCI express interface a serial attached SCSI (SAS) interface, a MS interface, a MMC interface, a SD interface, a CF interface or a IDE interface.

The program memory 122e is electrically connected to the microprocessor unit 122h and used for storing the program code to be executed by the controller for controlling the non-volatile memory storage device 120.

The error correction module 122f is electrically connected to the microprocessor unit 122h and used for calculating an error correcting code to check and correct the data read or written by the host.

The power management module 122g is electrically connected to the microprocessor unit 122h and used for managing the power supply of the non-volatile memory storage device 120.

The non-volatile memory 124 is used for storing the data. In the present embodiment, the non-volatile memory 124 is a flash memory. More particularly, the non-volatile memory 124 is a multi level cell (MLC) NAND flash memory. However, the present invention is not limited thereof, the non-volatile memory 124 may also be a single level cell (SLC) NAND flash memory.

The non-volatile memory 124 is substantially divided into a plurality of physical blocks 124-0~124-N. For convenience, the physical blocks are referred to as blocks below. Generally, the block is a minimum unit that may be erased within the flash memory. Namely, each block contains a minimum number of memory cells that may be erased together. Each block is generally divided into a plurality of pages, and the page is the minimum unit that may be programmed. It should be noted that according to different designs of the flash memory, the minimum programmable unit may also be a sector, namely, the page may be divided into a plurality of the sectors, and the sector is the minimum unit that may be programmed. In other words, the page is the minimum unit that data may be written on or read from. Each page generally includes a user data area D and a redundant area R. The user data area is used for storing a user data, and the redundant area is used for storing a system data (for example, the aforementioned error correcting code).

The user data area D usually has 512 bytes and the redundant area R usually has 16 bytes in order to correspond to the size of a sector in a disk driver. Namely, one page is one sector. However, the page may also include a plurality of the sectors, for example, one page may include 4 sectors. Generally, the block may include arbitrary number of pages, for example, 64 pages, 128 pages, 256 pages etc. The blocks 124-0~124-N are generally grouped into a plurality of zones, and managing of the memory based on the zones results in the fact that the zones may be operated independently, so as to increase a parallel degree of operation, and simplify a complexity of management.

When some blocks of the non-volatile memory 124 are continuously programmed (for example, repeatedly written and erased), these blocks may be worn more quickly than those blocks without being continuously programmed. To effectively level wearing of the blocks within the non-volatile memory 124, the wear leveling method of the present invention may be applied, by which utilization of the blocks being continuously programmed may be automatically decreased, and the blocks without being continuously programmed may be automatically utilized, such that a lifespan of the non-volatile memory 124 may be prolonged.

Operation of the non-volatile memory will now be described more fully with reference to the accompanying drawings. It should be understood that the terms used herein such as "select", "move", "exchange" etc. for operating the blocks of the flash memory are only logical concepts. Namely, the blocks of the flash memory are only operated logically, and actual positions of the blocks are not changed.

FIGS. 2A, 2B, 2C and 2D are detailed block diagrams of the non-volatile memory 124 and operation methods thereof.

Figure 2A:
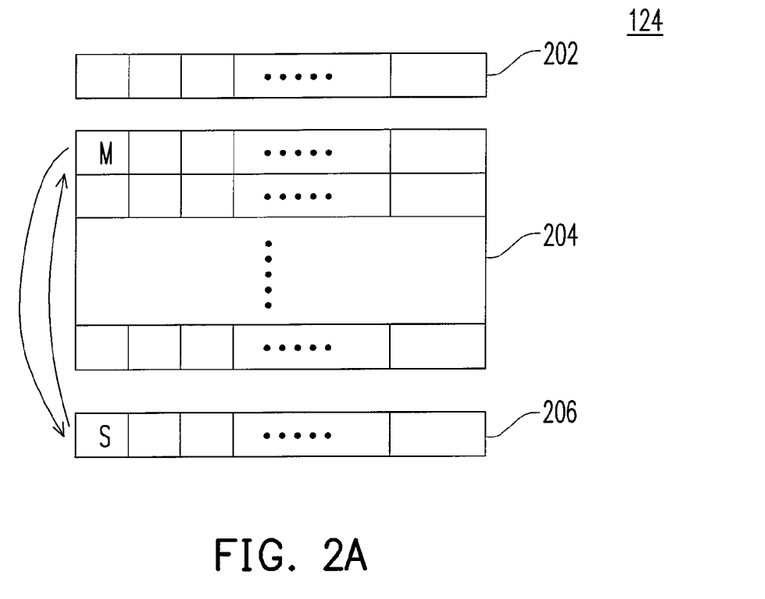
FIGS. 2A, 2B, 2C and 2D are detailed block diagrams illustrating a non-volatile memory and operation methods thereof according to the first embodiment of the present invention.

Referring to FIG. 2A, in the present embodiment, to effectively program (i.e. write and erase) the non-volatile memory 124, the blocks 124-1~124-N of the non-volatile memory 124 may be logically grouped into a system area 202, a data area 204 and a spare area 206. Generally, the data area 204 may occupy 90% area of the non-volatile memory 124.

Blocks in the system area 202 are used for recording system data, such as the number of zones in the non-volatile memory 124, the number of blocks in each zone, the number of pages in each block, and a logical-physical mapping table etc.

The blocks of the data area 204 are used for storing the user data, and the blocks generally map to the logical block addresses operated by the host 100.

The blocks of the spare area 206 are used for substituting the blocks of the data area 204. Therefore, the blocks of the spare area 206 are empty blocks, namely, no data or data has been marked invalid is stored therein. More particularly, if data is about to be written to the locations with data thereon, erasing of the existing data has to be performed first. However, as mentioned above, the page is the minimum writable unit, and the block is the minimum erasable unit. The minimum erasable unit is greater than the minimum writable unit, which represents if the block is about to be erased, effective pages within the block have to be copied to the other blocks first. Therefore, when a new data is about to be written to a block M written with data within the data area 204, a block S is generally selected from the spare are 206, and then effective data written on the block M is copied to the block S and the new data is written on the block S. Next, the block M is erased and moved to the spare area 206, meanwhile, the block S is moved to the data area 204 (as shown in FIG. 2A). It should be noted that moving of the block M to the spare area 206 after the block M is erased, and moving of the block S to the data area 204 represent the block M is logically associated with the spare area 206, and the block S is logically associated with the data area 204. It should be understood by those skilled in the art that logical relationships of the blocks within the data area 204 may be maintained by the logical physical mapping table.

Figure 2B:
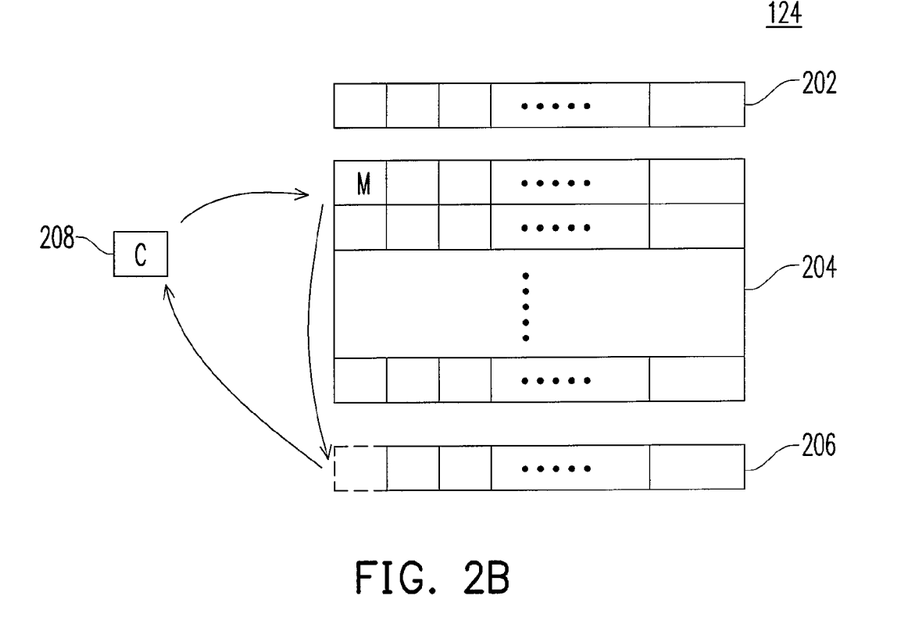

In the present embodiment, to effectively utilize the non-volatile memory 124, the blocks 124-1~124-N are further logically grouped into a substitute area 208 and a temporary area 210.

Referring to FIG. 2B, the substitute area 208 is used for temporarily storing the blocks used for substituting the blocks of the data area 204. To be specific, when a block C of the spare area 206 is selected for substituting the block M of the data area 204, in the present embodiment, the new data is written to the block C, and the effective data stored on the block M may not be moved to the block C immediately and the block M may not be erased immediately. This is because the effective data on the block M may be turned to invalid during a next operation. Therefore, immediate movement of the effective data on the block M to the physical block C is unnecessary. In the present embodiment, the block C written with the new data may be temporarily associated to the substitute area, and a situation of a plurality of the physical block addresses (PBAs) mapping to one logical block address (LBA) may be recorded, namely, integration of the data on the block M and the block C is the data on the mapped logical block, such that utilization efficiency of the blocks is improved. Such mother-child relationship between blocks (such as block M and block C) may be determined by the size of the buffer memory 122d within the controller 122, and five groups are taken as an example in the present embodiment.

Figure 2C:
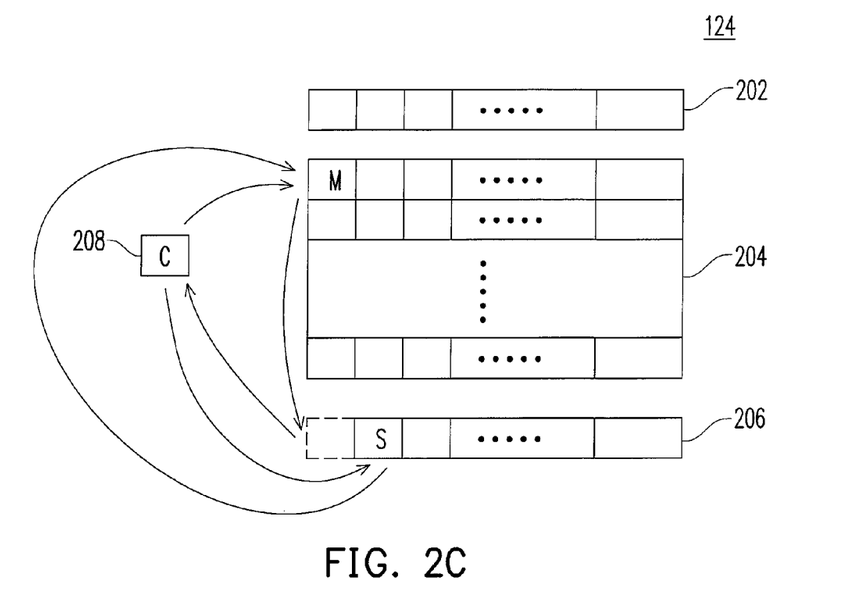

Next, when the data of the block M and the data of the block C need to be actually integrated, there are two methods as follows. One method is to copy the effective data of the block M to the block C, and then the block M is erased and moved to the spare area 206, meanwhile, the block C is moved to the data area 204 from the substitute area 208 to complete the integration (as shown in FIG. 2B). Another method is to select a block from the spare area 206, and the effective data of the block M and the block C are copied to the selected block, and then the block M and the block C are erased and moved to the spare area 206, meanwhile, the selected block is moved to the data area 204, so as to complete the integration (as shown in FIG. 2C).

Figure 2D:
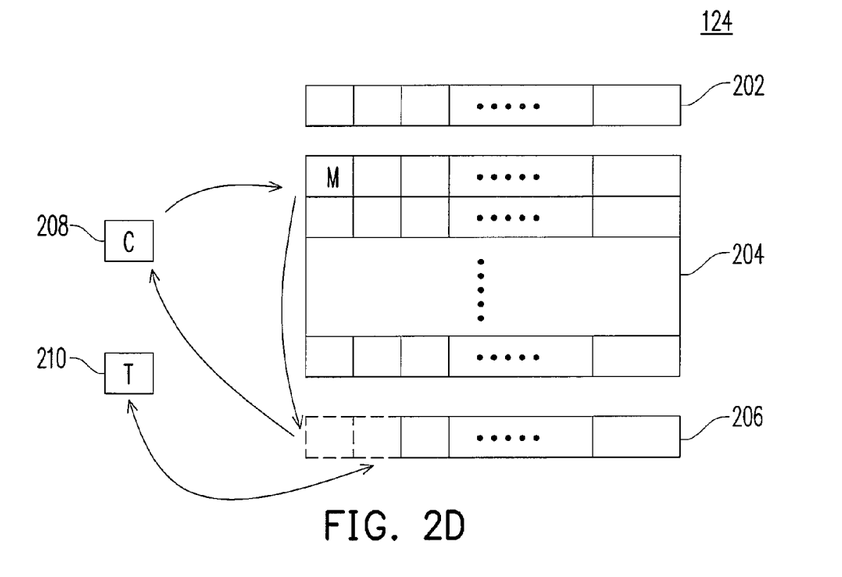

The function of the temporary area 210 is similar to that of the substitute area 208. As described above, the MLC NAND flash memory is applied in the present embodiment, and one page of the MLC NAND flash memory may include 4 sectors, i.e. one page includes four 512 bytes sectors, and 2 K bytes in total. As described above, the page is the minimum unit that may be programmed, and therefore each time 4 sectors has to be programmed when the MLC NAND flash memory is applied, which may cause a waste when a small amount of data is written thereon. In the present embodiment, the temporary area 210 is used for temporarily storing such small amount of data. To be specific, if the data to be written to the block C of the substitute area 208 is the small amount of data which is less than one page, a block T is selected from the spare area 206, and such small amount of data is written to the block T and the block T is associated to the temporary area 210. Then, when the follow-up written data is enough to fill up one page, these data is written to the block C, and the block T is erased and moved to the spare area 206 from the temporary area 210 (as shown in FIG. 2D).

It should be noted that during operation of the non-volatile memory storage device, the logical mapping relationships of the aforementioned blocks may be continuously renewed within the buffer memory 122d, and the information within the buffer memory 124 may be recorded to the blocks of the system area 202 after operation of the non-volatile memory storage device is completed or after each several operations of the non-volatile memory storage device.

Generally, the blocks frequently exchanged between the data area 204 and the spare area 206 is referred to as dynamic data blocks. In the present embodiment, designs of the substitute area 208 and the temporary area 210 are used for improving the utilization efficiency of the dynamic data blocks. Moreover, some data written in the data area 204 may keep unchanged for a long time, for example, a user may store 100 favorite MP3 songs within the data area 204, and the stored MP3 songs may keep unchanged for a long time. The blocks used for storing such kind of data are referred to as static data blocks. Erase times of the static data blocks may be relatively low due to little change of the stored data. In the present embodiment, the memory management module 122a of the controller 122 may implement the wear leveling method to effectively level wearing of the blocks 124-1~124-N.

The wear leveling method of the present embodiment includes: a physical block is selected from a spare area based on an erased sequence of the physical blocks (step S1310); and a wear leveling procedure is performed (step S 1320). In another embodiment of the present invention, in the step S 1310, the physical block is selected from the spare area based on a weight mark.

Figure 3:
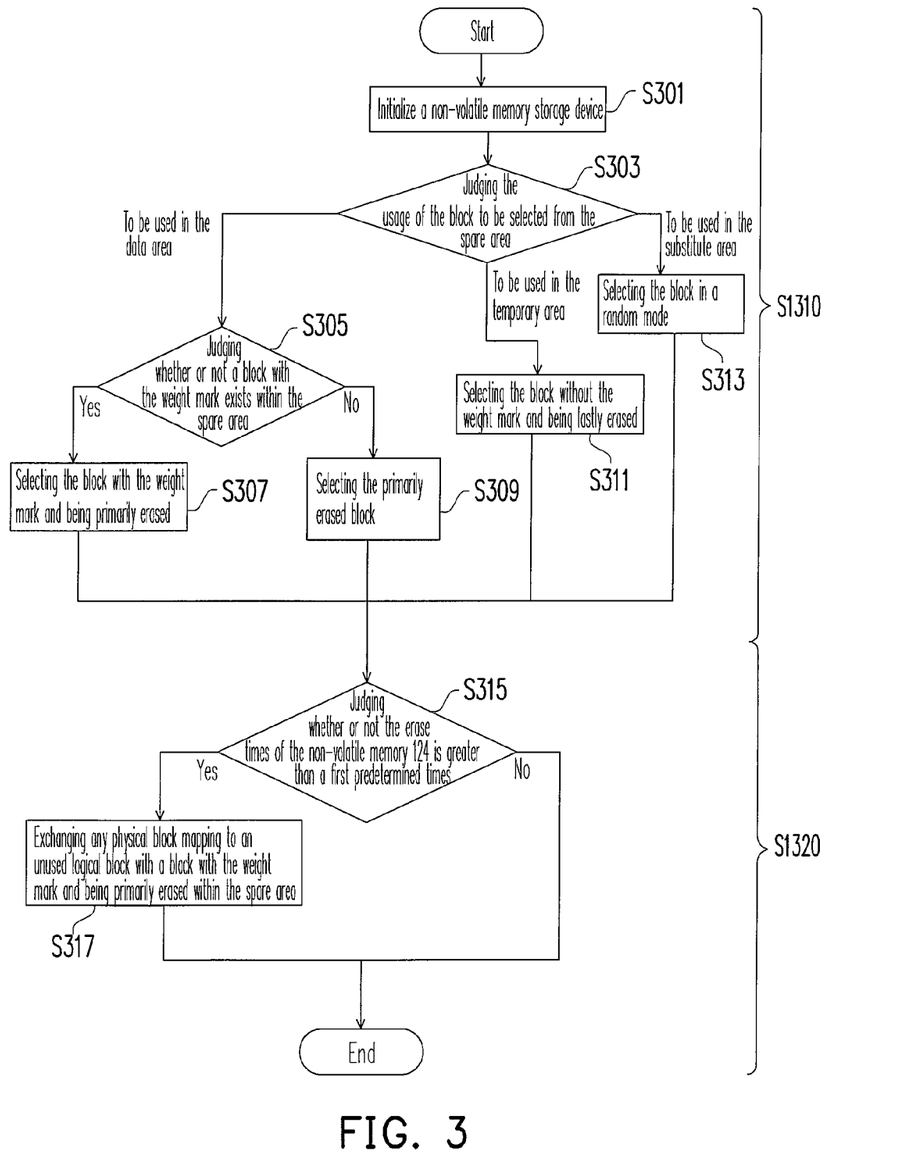
FIG. 3 is a flowchart illustrating a wear leveling method according to the first embodiment of the present invention.

FIG. 3 is a flowchart illustrating a wear leveling method. When the wear leveling method is applied for programming the memory blocks, the memory blocks may be evenly utilized to achieve the wear leveling effect. The wear leveling method is described in detail accompanying with a drawing of FIG. 3.

Referring to FIG. 3 and FIG. 1, in step S301, when the non-volatile memory storage device 120 is initialized, an erased block table 400 may be setup. The erased block table 400 is used for sequentially recording the erased blocks. To be specific, each time when the block is erased, the block address of the erased block is recorded in the erased block table 400. During management of programming and erasing of the flash memory, it should be understood by those skilled in the art that the erased blocks are generally moved to the spare area 206 for a next utilization of programming. Therefore, by sequentially recording the erased blocks in the erased block table 400, the erased sequence of the blocks in the spare area 206 then may be obtained according to the erased block table 400.

Figure 4:
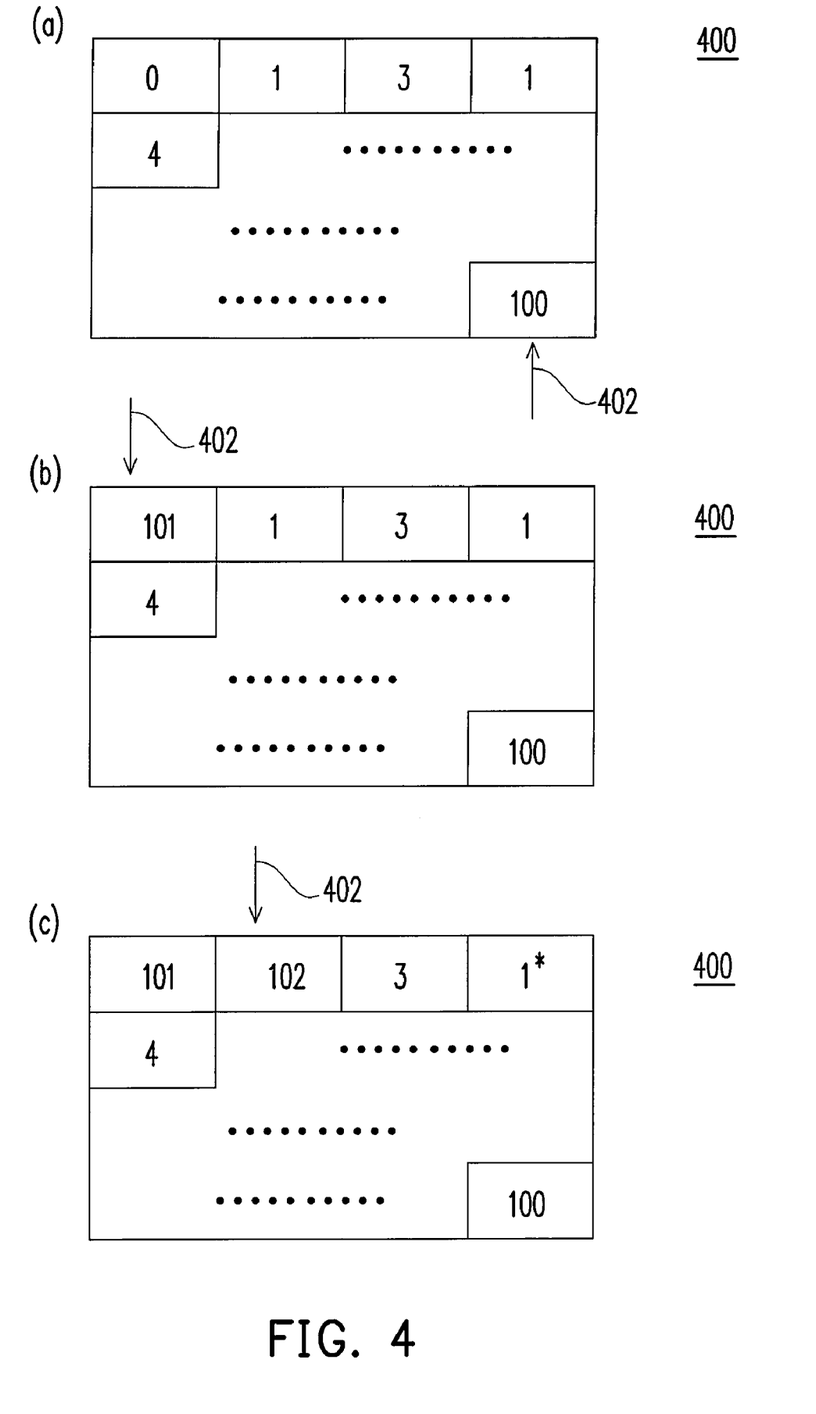
FIG. 4 is a schematic diagram illustrating an erased block table and a recording method thereof according to the first embodiment of the present invention.

FIG. 4 is a schematic diagram illustrating an erased block table and a recording method thereof. Referring to FIG. 4, each field of the erased block table 400 may record a block address of the erased block, the block addresses are recorded in the erased block table 400 in a sequence from the left to the right, and from the top to the bottom. When all the fields are filled up, recording may be continuously performed from a start position in a circular coverage mode. The erased block table 400 includes a record index 402, which is used for indicating a present recording position.

As shown in FIG. 4(a), assuming the system erases the blocks in a sequence of block 0, block 1, block 3, block 4 . . . block 100, the erased block table 400 then may sequentially record these blocks, and the record index 402 is located in front of the block 0 for indicating the block 0 is the first erased block, and the block 100 is the last erased block among the erased blocks block 0, block 1, block 3, block 4 . . . block 100. It should be noted that before the erased block is recorded, whether or not the recording times of the erased block within the erased block table 400 reaches a second predetermined times is judged, if yes, the erased block is not recorded, wherein the second predetermined times is determined based on an average wearing effect achieved. In the present embodiment, the second predetermined times is 2, though it should be understood that the present invention is not limited thereof. For example, the block 1 of the FIG. 4(a) has been recorded twice, and therefore if the block 1 is again erased, it will not be recorded in the erased block table 400.

As shown in FIG. 4(b), after the situation shown as FIG. 4(a), when the non-volatile memory storage device 120 erases a block 101, the block 101 is then recorded to a position next to the record index 402, and since the position next to the record index 402 is cycled back to the start position, the former record for the block 0 then may be covered.

As shown in FIG. 4(c), after the situation shown as FIG. 4(b), when the non-volatile memory storage device 120 erases a block 102, the block 102 is then recorded to a position next to the record index 402. However, since the block 1 has been recorded in the erased block table for the predetermined times, i.e. 2 times, another record of the block 1 is then marked with a weight mark (shown as 1* of FIG. 4) before a present record is covered. The weight mark is used for indicating erase times of the block is greater than the predetermined times. In the present embodiment, if a former record to be covered has the weight mark, the record will not be covered, and a next corresponding record without the weight mark will be covered.

It should be noted that in the present embodiment, if the blocks within the spare area 206 has no record in the erased block table 400, it represents such blocks are erased more earlier than those recorded within the erased block table 400.

In the present embodiment, the erased block table 400 is recorded in the buffer memory 122d, and each time the non-volatile memory storage device 120 is restarted, a new erased block table 400 is established, and all the former records are reset. However, in another embodiment of the present invention, the erased block table 400 may also be periodically recorded to the blocks within the system area 202 during operation of the non-volatile memory storage device 120, or may be recorded to the blocks within the system area 202 when operation of the non-volatile memory storage device 120 is completed, and when the non-volatile memory storage device 120 is restarted, the erased block table 400 then may be loaded from the system area 202 for utilization.

Referring to FIG. 3 again, in step S303, when the block is selected from the spare area 206, usage of the selected block is judged. If the selected block is used for the data area 204 according to a judgement of the step S303, in step S305, whether or not the block with the weight mark exists within the spare area 206 is then judged. If the block with the weight mark exists within the spare area 206 according to a judgement of the step S305, in step S307, the block with the weight mark and being erased primarily (which represents the records of the block have existed within the erased block table for a relatively long time) is then selected. To be specific, in the step S307, the block with the weight mark in the spare area 206 is searched according to the erased block table 400, and if a plurality of the blocks with the weight mark is found, the primarily erased block is then selected according to the erased sequence of the erased block table 400. If the block with the weight mark does not exist within the spare area 206 according to a judgement of the step S305, in step S309, the primarily erased block is then selected according to the erased sequence of the erased block table 400. Wherein, in the present invention, the so called block used for the data area 204 is the block S shown in FIG. 2A or FIG. 2C, which is selected from the spare area 206 and is used for substituting the block in the data area 204.

If the selected block is used for the temporary area 210 according to the judgement of the step S303, in step S311, the block without the weight mark and being lastly erased (which represents the record of the block has existed within the erased block table for a shortest time) within the spare area 206 is then selected. To be specific, in the step S311, whether or not the block which is not recorded in the erased block table exists is judged first. As described above, the block not recorded in the erased block table 400 is the primarily erased block. If the block that is not recorded in the erased block table 400 exists according to a judgement of the step S311, one of the blocks that are not recorded in the erased block table 400 is then randomly selected. If the block that is not recorded in the erased block table 400 does not exist, the block without the weight mark and being lastly erased is then selected according to the erased sequence of the erased block table 400.

If the selected block is used for the substitute area 208 according to the judgement of the step S303, in step S313, the block within the spare area 206 is then randomly selected. In another embodiment of the present invention, in the step S313, the block may be also selected from the spare area 206 according to a sequential mode.

In step S315, whether or not the erase times of the non-volatile memory 124 is greater than a first predetermined times is judged, and if yes, in step S317, a wear leveling procedure is then performed. The wear leveling procedure is that exchanging a physical block in the spare area with a physical block in the data area. In another embodiment of the present invention, the wear leveling procedure includes: any physical block mapping to an unused logical block is exchanged with a block with the weight mark and being primarily erased within the spare area 206, and the counting value is reset (for example, is reset to 0), wherein if there is no block with the weight mark, the block being primarily erased it then selected. To be specific, in the wear leveling procedure, the so called "exchange" means the selected block is associated with the data area 204, and meanwhile association between the selected block and the spare area 206 is cancelled; and the physical block mapping to the unused logical block is associated with the spare area 206, and meanwhile the association between the physical block mapping to the unused logical block and the data area 204 is cancelled. In the present embodiment, the first predetermined times is set according to the average wear leveling effect to be achieved, and the first predetermined times may be ranged from 50~200, and in the present embodiment, the first predetermined times is 100, though it should be understood that the present invention is not limited thereof.

It should be noted that in the present embodiment, a starting mechanism of the wear leveling procedure is based on the erase times of the non-volatile memory 124. However, the present invention is not limited thereof, and those skilled in the art should be understood that any known starting mechanism may be applied herein. For example, the wear leveling procedure may also be started according to write times or according to a random mode.

In another embodiment of the present invention, the wear leveling method further includes recording utilization information of the logical blocks according to a logical physical mapping table (not shown). To be specific, to mark a utilization status of the logical blocks, one bit of the logical physical mapping table is used for recording the utilization information of the logical block. When the non-volatile memory storage device 120 is initialized, all the utilization information is marked as "0". Each time when the host 100 writes a certain logical block, the utilization information of this logical block is then marked as "1". In this case, the logical block marked as "1" represents a used block, and the block marked as "0" represents an unused block. Until all the logical blocks are marked as "1", the logical blocks marked as "1" then represents the unused blocks. Then, each time when the host 100 writes a certain logical block, the utilization information of this logical block is marked as "0". In this case, the logical block marked as "0" represents a used block, and the block marked as "1" represents an unused block. By such means, the used and unused logical blocks are then judged.

It should be noted that in the present embodiment, if there is no record within the erased block table 400, it represents the erased sequence and the weight of the blocks within the spare area 206 are all the same. Therefore, when the block is selected from the spare area 206, the block may be selected randomly. Similarly, in another embodiment of the present invention, the block may be selected according to the sequential mode.

In another embodiment of the present invention, the wear leveling method further includes executing a normal writing instruction of the host 100 to complete the step S317, so as to avoid problems occurred due to a sudden power-off.

The Second Embodiment

In the second embodiment of the present invention, the hardware structure, operation of the non-volatile memory, erased sequence of the blocks and recording of the weight mark are all the same to that of the first embodiment (shown as FIGS. 1A-1B, FIGS. 2A~2D, FIG. 4), the detailed description thereof will not be repeated. The difference between the second embodiment and the first embodiment is that in the second embodiment, different rules are only applied to a block selection by which the selected blocks are used for the substitute area and the data area.

Figure 5:
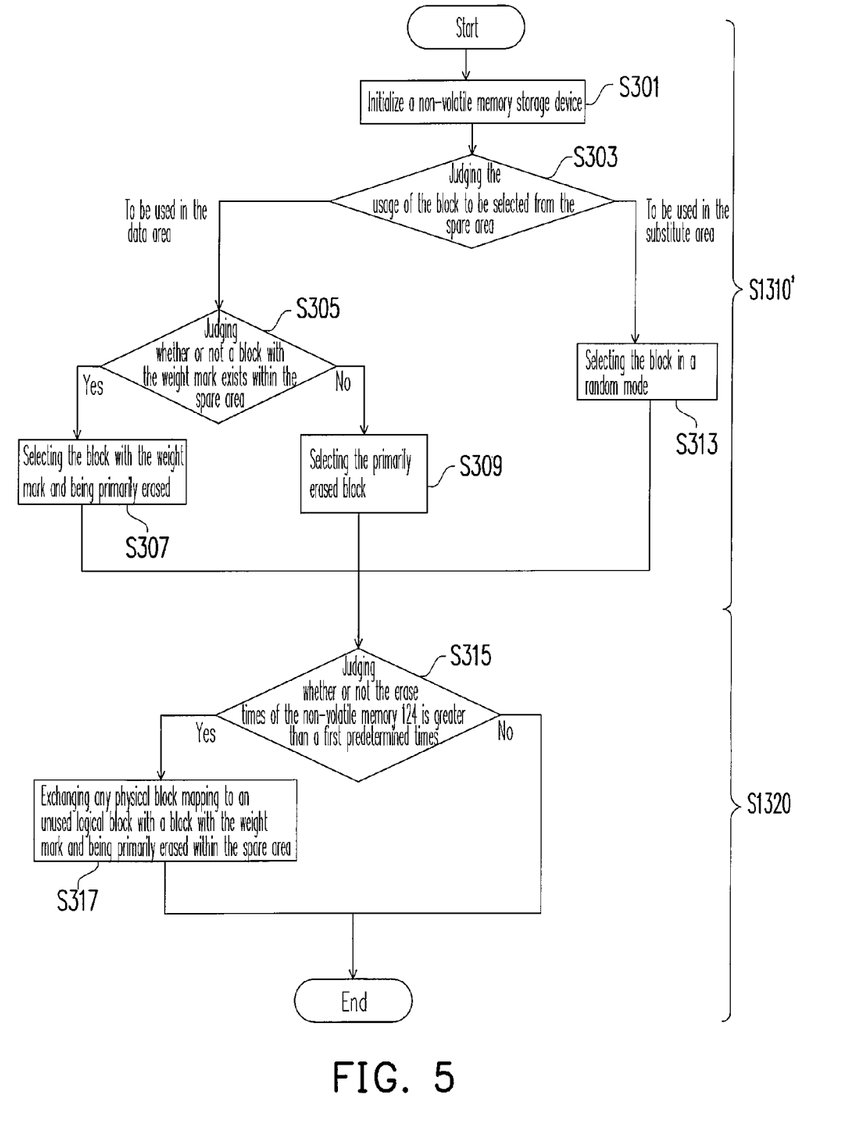
FIG. 5 is a flowchart illustrating a wear leveling method according to the second embodiment of the present invention.

FIG. 5 is a flowchart of a wear leveling method according to the second embodiment of the present invention. Referring to FIG. 5, the flowchart of FIG. 5 is similar to that of FIG. 3, except that different method of the block selection (step S1310') is only applied for the selected blocks used for the data area 204 and the substitute area 208, the detailed description thereof will not be repeated.

The Third Embodiment

In the third embodiment of the present invention, the hardware structure, operation of the non-volatile memory, erased sequence of the blocks and recording of the weight mark are all the same to that of the first embodiment (shown as FIGS. 1A~1B, FIGS. 2A~2D, FIG. 4), the detailed description thereof will not be repeated. The difference between the third embodiment and the first embodiment is that in the third embodiment, different rules are only applied to a block selection by which the selected blocks are used for the substitute area and the temporary area.

Figure 6:
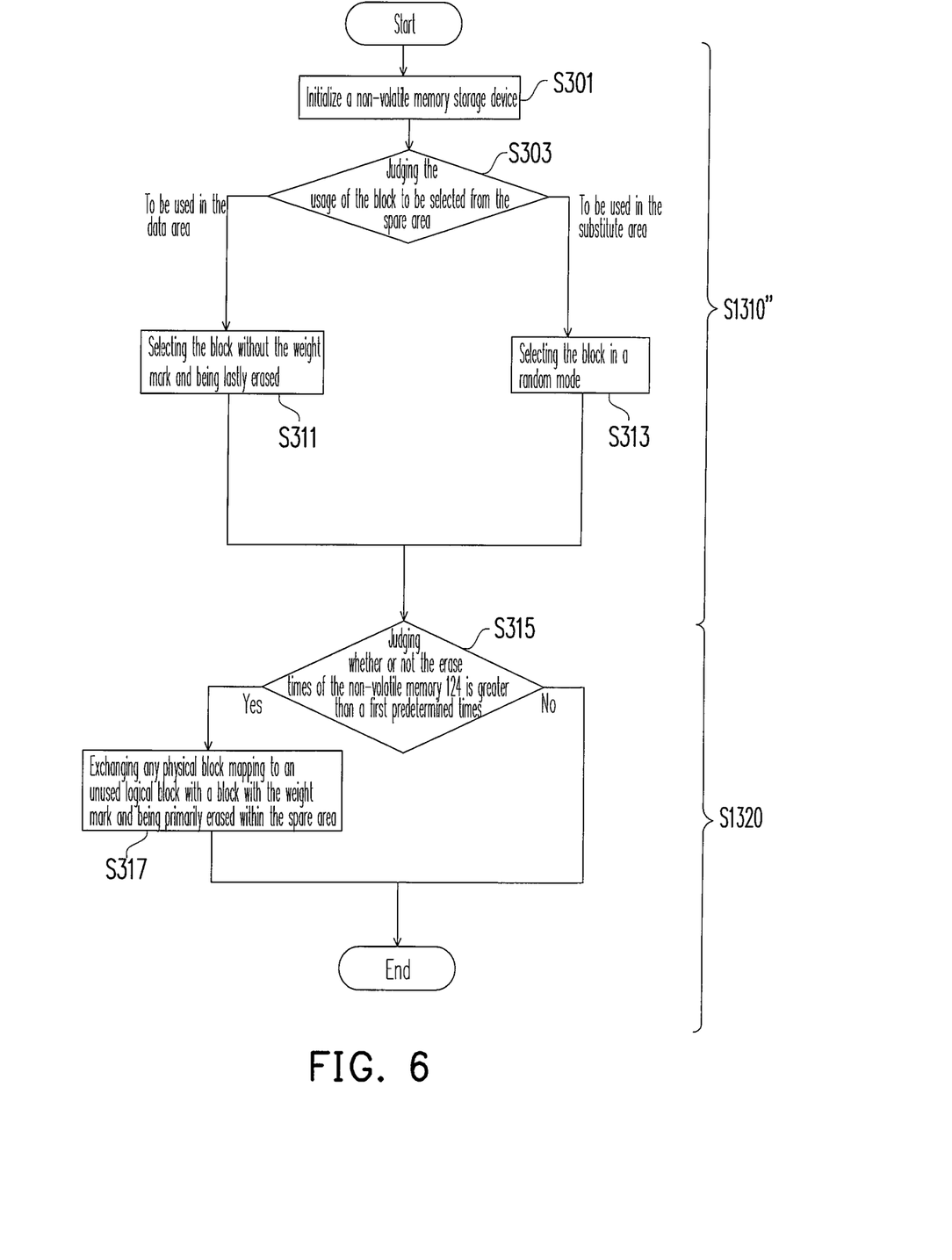
FIG. 6 is a flowchart illustrating a wear leveling method according to the third embodiment of the present invention.

FIG. 6 is a flowchart of a wear leveling method according to the third embodiment of the present invention. Referring to FIG. 6, the flowchart of FIG. 6 is similar to that of FIG. 3, except that different method of the block selection (step S1310") is only applied for the selected blocks used for the temporary area 210 and the substitute area 208.

According to the first, the second and the third embodiments of the present invention, the blocks selected from the spare area 206 are judged to be used for the data area 205, the substitute area 208 or the temporary area 210. However, the present invention is not limited thereof. In other words, in another embodiment of the present invention, the blocks selected from the spare area 206 may also be applied for other usages, or block selection may be performed only for one of the data area 204, the substitute area 208 and the temporary area 210, or a combination thereof.

The Fourth Embodiment

In the fourth embodiment of the present invention, the hardware structure, operation of the non-volatile memory, erased sequence of the blocks and recording of the weight mark are all the same to that of the first embodiment (shown as FIGS. 1A~1B, FIGS. 2A~2D, FIG. 4), the detailed description thereof will not be repeated. The difference between the fourth embodiment and the first embodiment is that in the wear leveling method of the first embodiment, selection of the physical block from the spare area and performing of the wear leveling procedure are according to the erased sequence of the physical blocks and the weight mark, however, in the fourth embodiment, wear leveling effect may be achieve only by performing the wear leveling procedure.

Figure 7:
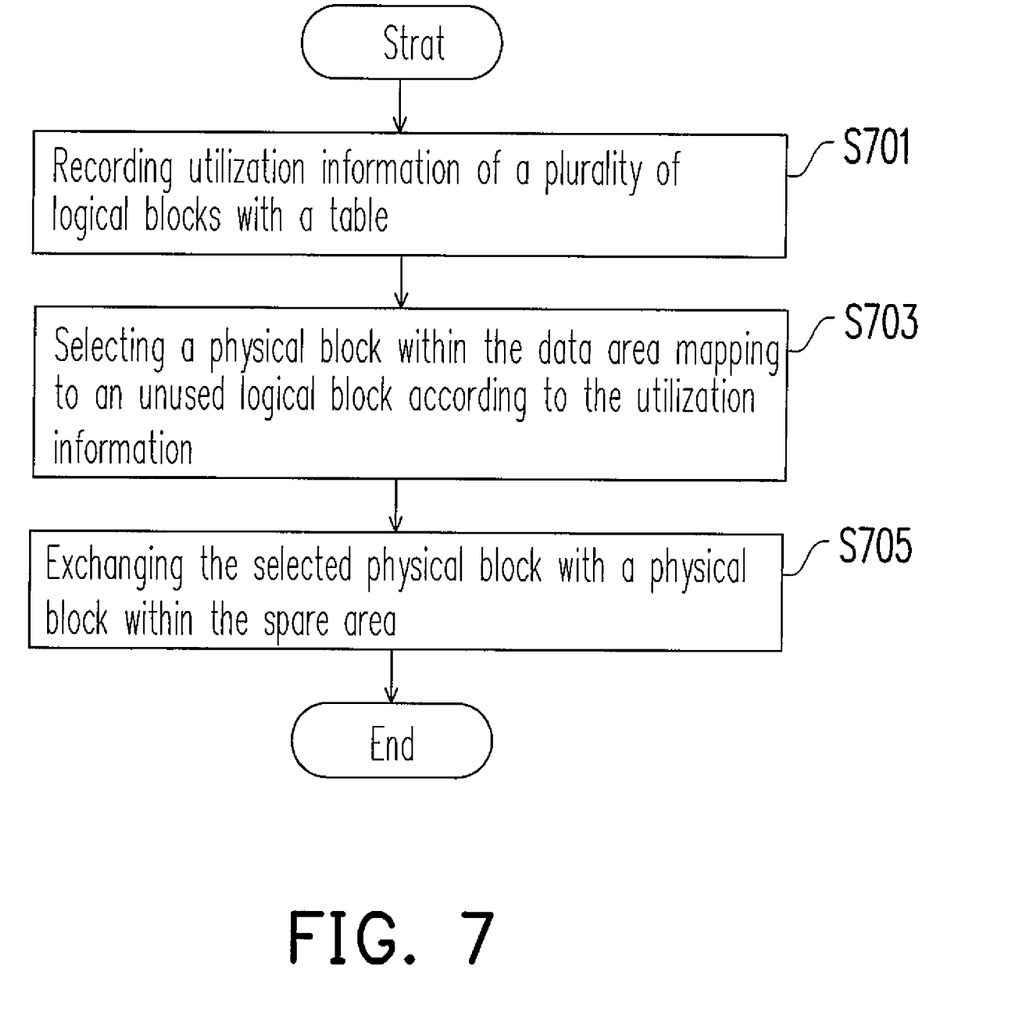
FIG. 7 is a flowchart illustrating a wear leveling method according to the fourth embodiment of the present invention.

FIG. 7 is a flowchart of a wear leveling method according to the fourth embodiment of the present invention. The method is as follows, in step S701, utilization information of a plurality of the logical blocks are recorded with a table. Next, in step S703, a physical block mapping to an unused logical block within the data area is selected according to the utilization information. Last, in step S705, the selected physical block is exchanged to the physical block within the spare area. Wherein, the table mentioned in the step S701 may be a logical physical mapping table.

Figure 8:
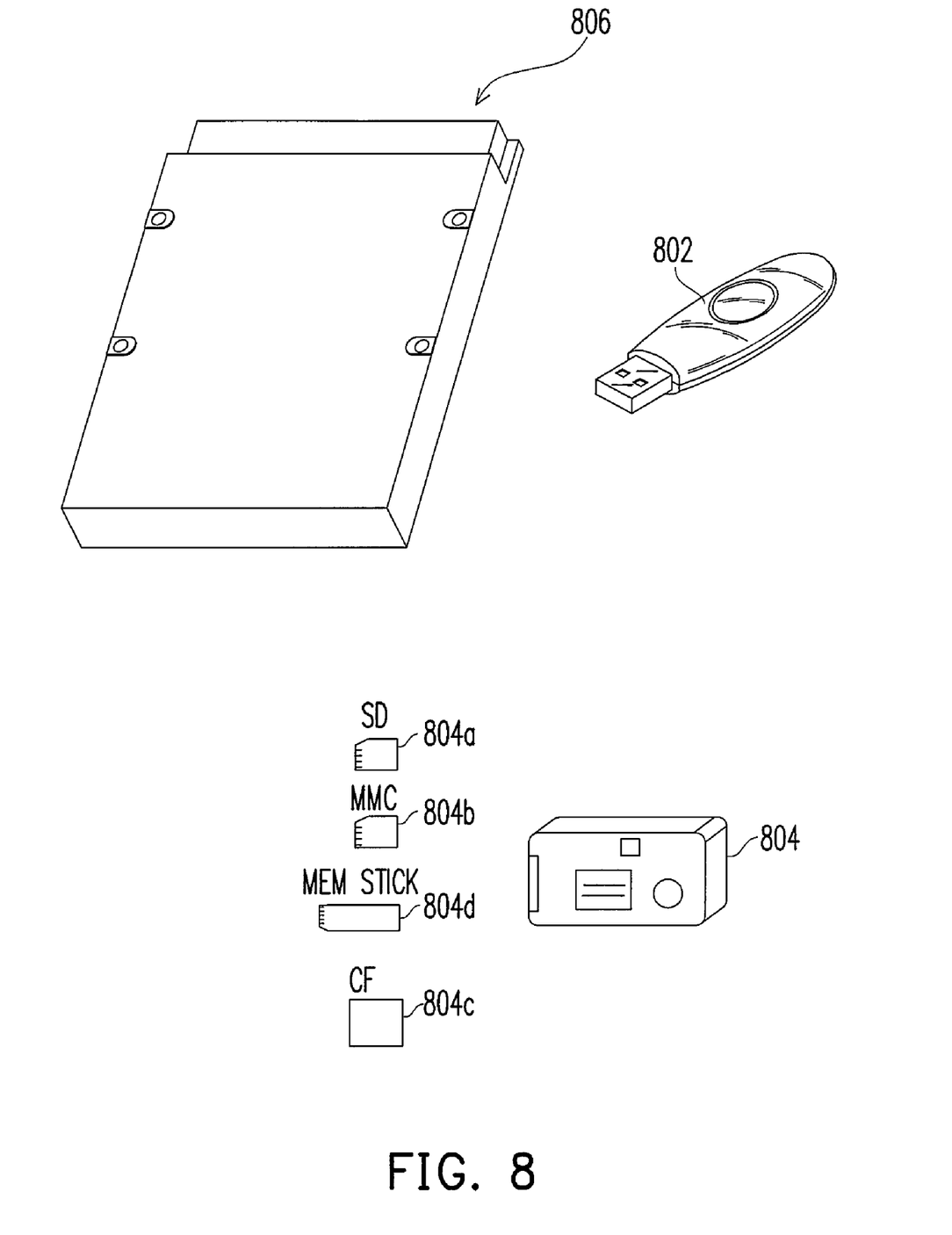
FIG. 8 is a schematic diagram illustrating devices using the wear leveling method of the present invention.

The wear leveling method provided by the present invention is suitable for the non-volatile memory, and therefore the wear leveling method of the present invention may be applied to any devices using the non-volatile memory as a storage media. For example, the wear leveling method may be applied to the devices shown in FIG. 8, such as an USB flash drive 802, a solid state drive 806 and a SD card 804a, a MMC card 804b, a CF card 804c and a memory stick 804d used for a digital camera (video camera) 804 etc. Wherein, the solid stat drive 806 especially requires a better wear leveling method.

In summary, the wear leveling method of the present invention applied to the non-volatile memory may effectively level wearing of the blocks within the memory, such that lifespan of the memory may be prolonged. Moreover, the total erase times according to the wear leveling method of the present invention is similar to that of the conventional method, which may not cause an extra erasing burden. However, compared to the conventional method, the method of the present invention may further level the erase times of the memory blocks.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

What is claimed is:

1. A wear leveling method for a non-volatile memory, wherein the non-volatile memory is substantially divided into a plurality of physical blocks, and the physical blocks are at least grouped into a data area, a spare area and a temporary area, the wear leveling method comprising:
    recording a plurality of erased physical blocks in an erased block table based on an erased sequence of the erased physical blocks, wherein the erased physical blocks are recorded without a weight mark or with the weight mark;
    when a target physical block is about to be selected from the spare area, judging whether the target physical block is used for the data area or the temporary area;
    selecting a physical block with the weight mark and being primarily erased among the physical blocks of the spare area to be the target physical block based on the erased sequence in the erased block table when the target physical block is used for the data area;
    selecting a physical block without the weight mark and being lastly erased within the spare area to be the target physical block based on the erased sequence in the erased block table when the target physical block is used for the temporary area; and
    performing a wear leveling procedure.

2. The wear leveling method for a non-volatile memory as claimed in claim 1, wherein the wear leveling procedure comprises: exchanging the physical block mapping to an unused logical block with the physical block with the weight mark within the spare area.

3. The wear leveling method for a non-volatile memory as claimed in claim 2 further comprising: recording utilization information of a logical block by using a logical physical mapping table.

4. The wear leveling method for a non-volatile memory as claimed in claim 1, wherein the step of performing the wear leveling procedure is executed whenever performing the erasing of the physical blocks for a first predetermined erasing times.

5. The wear leveling method for a non-volatile memory as claimed in claim 1, wherein the step of performing the wear leveling procedure is executed in a random mode.

6. The wear leveling method for a non-volatile memory as claimed in claim 1, wherein the erased physical block is not recorded if the erased physical block has been recorded in the erased block table for a second predetermined times.

7. The wear leveling method for a non-volatile memory as claimed in claim 6 further comprising: if there is no record within the erased block table, selecting the physical block from the spare area in the random mode or the sequential mode when the physical block is selected from the spare area.

8. The wear leveling method for a non-volatile memory as claimed in claim 1, wherein the step of recording the erased physical blocks in the erased block table based on the erased sequence of the erased physical blocks comprising: recording the erased physical blocks according to a circular coverage mode, wherein if the erased physical block repeatedly recorded in the erased block table is about to be overwritten, a primary record of other erasing records of the erased physical block within the erased block table is then marked with the weight mark.

9. The wear leveling method for a non-volatile memory as claimed in claim 1, wherein the step of selecting the physical block with the weight mark and being primarily erased within the spare area based on the erased sequence in the erased block table when the physical block is used for the data area comprises: judging whether the physical block with the weight mark exists in the spare area, and selecting a primarily erased physical block within the spare area based on the erased sequence in the erased block table if there is no physical block with the weight mark.

10. The wear leveling method for a non-volatile memory as claimed in claim 1, wherein the step of selecting the physical block based on an erased sequence of the erased physical blocks recorded in the erased block table and the usage further comprising: selecting the physical block from the spare area in a random mode or a sequential mode when the physical block is selected from the spare area and is used for a substitute area further grouped according to the physical blocks.

11. The wear leveling method for a non-volatile memory as claimed in claim 1, wherein the step of performing the wear leveling procedure is executed by a normal writing instruction of a host.

12. A controller, for a storage device, wherein a non-volatile memory of the storage device is substantially divided into a plurality of physical blocks, and the physical blocks are at least grouped into a data area and a spare area, the controller comprising:
a microprocessor unit is configured for controlling a whole operation of the controller;
a buffer memory is electrically connected to the microprocessor unit and configured for temporarily storing data;
a non-volatile memory interface is electrically connected to the microprocessor unit and configured for accessing the non-volatile memory; and
a memory management module is electrically connected to the microprocessor unit and configured for managing the non-volatile memory, wherein the memory management module records a plurality of erased physical blocks in an erased block table based on the erased sequence of the erased physical blocks, wherein the erased physical blocks are recorded without a weight mark or with the weight mark,
wherein when a target physical block is about to be selected from the spare area, the memory management module judges whether the target physical block is used for the data area or the temporary area,
wherein the memory management module selects a physical block with the weight mark and being primarily erased among the physical blocks of the spare area to be the target physical block based on the erased sequence in the erased block table when the target physical block is used for the data area,
wherein the memory management module selects a physical block without the weight mark and being lastly erased among the physical blocks of the spare area to be the target physical block based on the erased sequence in the erased block table when the target physical block is used for the temporary area,
wherein the memory management module exchanges the physical block in the spare area with a physical block in the data area.

13. The controller as claimed in claim 12, wherein the memory management module exchanges the physical block mapping to an unused logical block with the physical block with the weight mark within the spare area.

14. The controller as claimed in claim 13, wherein the memory management module further records utilization information of a logical block by using a logical physical mapping table.

15. The controller as claimed in claim 12, wherein the memory management module exchanges the physical block in the spare area with the physical block in the data area whenever the memory management module performs the erasing of the physical blocks for a first predetermined erasing times.

16. The controller as claimed in claim 12, wherein the memory management module exchanges the physical block in the spare area with the physical block in the data area in a random mode.

17. The controller as claimed in claim 12, wherein the erased physical block is not recorded if the erased physical block has been recorded in the erased block table for a second predetermined times.

18. The controller as claimed in claim 17, wherein if there is no record within the erased block table, the memory management module selects the physical block from the spare area in the random mode or the sequential mode when the physical block is selected from the spare area.

19. The controller as claimed in claim 12, wherein the memory management module further records the erased physical block in the erased block table according to a circular coverage mode, wherein if the erased physical block repeatedly recorded in the erased block table is about to be overwritten, a primary record of other erasing records of the erased physical block within the erased block table is then marked with the weight mark.

20. The controller as claimed in claim 12, wherein the memory management module further judges whether the physical block with the weight mark exists in the spare area, and selects a primarily erased physical block within the spare area based on the erased sequence in the erased block table if there is no physical block with the weight mark.

21. The controller as claimed in claim 12, wherein the memory management module further selects the physical block from the spare area in a random mode or a sequential mode when the physical block is selected from the spare area and is used for a substitute area further grouped according to the physical blocks.

22. The controller as claimed in claim 12, wherein the memory management module further exchanges the physical block in the spare area with the physical block in the data area by executing a normal writing instruction of a host.

23. The controller as claimed in claim 12, wherein the non-volatile memory is a SLC NAND flash memory or a MLC NAND flash memory.

* * * * *